United States Patent
DeLuca et al.

(10) Patent No.: US 11,334,853 B2
(45) Date of Patent: May 17, 2022

(54) ACCESSIBILITY BASED CALENDAR MANAGEMENT

(71) Applicant: International Business Machines Corporation, Armonk, NY (US)

(72) Inventors: Lisa Seacat DeLuca, Baltimore, MD (US); Nadiya Kochura, Bolton, MA (US); Fang Lu, Billerica, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/915,642

(22) Filed: Jun. 29, 2020

(65) Prior Publication Data

US 2021/0406840 A1 Dec. 30, 2021

(51) Int. Cl.
*G06Q 10/10* (2012.01)
*G06Q 10/06* (2012.01)
*G06N 5/04* (2006.01)
*H04W 4/029* (2018.01)
*H04L 67/10* (2022.01)

(52) U.S. Cl.
CPC ......... *G06Q 10/1095* (2013.01); *G06N 5/043* (2013.01); *G06Q 10/06314* (2013.01); *G06Q 10/105* (2013.01); *H04W 4/029* (2018.02); *H04L 67/10* (2013.01)

(58) Field of Classification Search
None
See application file for complete search history.

(56) References Cited

U.S. PATENT DOCUMENTS

| 8,832,301 | B2 | 9/2014 | Graff et al. |
| 9,160,746 | B2 | 10/2015 | Adderly et al. |
| 2005/0049916 | A1* | 3/2005 | Tracht ............... G06Q 30/02 705/14.27 |
| 2006/0293613 | A1* | 12/2006 | Fatehi ............... A61B 5/447 600/595 |
| 2007/0008181 | A1* | 1/2007 | Rollert ............... G06Q 10/02 340/932.2 |
| 2007/0294120 | A1* | 12/2007 | Berstis ............ G06Q 10/06313 705/7.19 |
| 2009/0132329 | A1 | 5/2009 | Lam et al. |
| 2009/0327019 | A1 | 12/2009 | Addae et al. |
| 2011/0066468 | A1 | 3/2011 | Huang et al. |
| 2011/0106573 | A1 | 5/2011 | McNamara |

(Continued)

OTHER PUBLICATIONS

IP.com, Customised route finder based upon individual requirements, IP.com No. IPCOM000253235D, Mar. 15, 2018.

(Continued)

*Primary Examiner* — Sujay Koneru
(74) *Attorney, Agent, or Firm* — Garg Law Firm, PLLC; Rakesh Garg; Rob Bean

(57) ABSTRACT

By analyzing a set of actions of a meeting attendee, a set of accommodation rules for the meeting attendee is determined. Responsive to determining, using a set of facility data, that a meeting request for the meeting attendee violates an accommodation rule in the set of accommodation rules, the meeting request is modified, the modified meeting request conforming to the set of accommodation rules. A meeting location and a meeting time are assigned according to the modified meeting request.

18 Claims, 12 Drawing Sheets

(56) References Cited

U.S. PATENT DOCUMENTS

| | | | | |
|---|---|---|---|---|
| 2011/0153193 | A1* | 6/2011 | Fox | G01C 21/20 |
| | | | | 701/533 |
| 2013/0205257 | A1 | 8/2013 | Albright | |
| 2013/0315042 | A1* | 11/2013 | Kindel | G04G 9/0076 |
| | | | | 368/10 |
| 2014/0120951 | A1* | 5/2014 | Hodges | H04L 67/325 |
| | | | | 455/456.2 |
| 2014/0355490 | A1* | 12/2014 | Podal | H04L 65/403 |
| | | | | 370/261 |
| 2015/0058057 | A1 | 2/2015 | Egan et al. | |
| 2015/0193819 | A1* | 7/2015 | Chang | G06Q 30/0252 |
| | | | | 705/7.19 |
| 2016/0012359 | A1* | 1/2016 | Wood | G06F 30/13 |
| | | | | 705/7.12 |
| 2016/0117624 | A1* | 4/2016 | Flores | H04L 67/306 |
| | | | | 705/7.39 |
| 2018/0174112 | A1* | 6/2018 | Breedvelt-Schouten | |
| | | | | G06Q 10/1095 |
| 2019/0272509 | A1* | 9/2019 | Livnat | H04W 4/029 |
| 2019/0342107 | A1* | 11/2019 | Vogel | H04L 12/1822 |
| 2020/0410408 | A1* | 12/2020 | Shitara | H04W 4/029 |
| 2021/0014676 | A1* | 1/2021 | Silverstein | H04W 4/029 |
| 2021/0174309 | A1* | 6/2021 | Chhabra | G06Q 10/1095 |

OTHER PUBLICATIONS

Augsburg University, Accessible Event Planning Guide, 2020, https://inside.augsburg.edu/events/additional-resources-and-information/accessible-events/accessible-event-planning-guide/.

* cited by examiner

ACCESSIBILITY BASED CALENDAR MANAGEMENT

BACKGROUND

The present invention relates generally to a method, system, and computer program product for meeting scheduling. More particularly, the present invention relates to a method, system, and computer program product for accessibility based calendar management.

Facility users have a variety of accessibility needs when accessing portions of a physical facility. For example, a wheelchair user might be unable to navigate stairs or an escalator, and instead require a ramp or an elevator. Someone using crutches might be able to navigate stairs, but move more slowly than those who do not use crutches. Someone with a vision challenge might prefer a route with a specific lighting condition or a certain type of signage.

Once a facility user reaches a room in which an in-person meeting is being held, the user might have additional accessibility needs. For example, in some large lecture halls stairs are the only method of accessing some seating areas. Someone who does not see well might prefer to sit close to a display screen, and someone who lip-reads might prefer to sit where every speaker's lips are easily visible. Some users might require or prefer a meeting room without windows, while others might require or prefer a meeting room with windows. Some users might have needs related to equipment available in a meeting room, such as a sufficiently large display screen or a microphone. In addition, if food or drinks are to be provided at a meeting, users have varying dietary needs.

Time between meetings is also a factor for attendees. Travel time between meeting rooms is a factor for every user, and different users move at different speeds or prefer different routes. In addition, some facility users might require or prefer additional time between meetings, for example to rest, take a medication on a set schedule, or accommodate the needs of a service animal.

A building management system is a computer-based control system installed in a facility that controls and monitors the building's mechanical and electrical equipment such as ventilation, lighting, power systems, fire systems, and security systems. A building management system typically includes hardware modules (e.g. a fire sensor, a sprinkler system activated if a fire is detected) and software to monitor sensors and control hardware outputs. A building management system often also includes maps and other facility data, for use in problem location and facility management. For example, a building management system might determine that a particular fire sensor has detected a fire, trigger the sprinkler system in an area near the fire sensor, disable the building elevators, trigger the building's fire alarms, alert the fire department, and provide arriving firefighters with a map including the best route to the triggered fire sensor. A building management system often also includes an ability to locate specific facility users within a facility, using access card data, a user's mobile device (e.g. via Wi-Fi, Bluetooth, or another method of wireless communication, on an opt-in basis), a Radio Frequency Identification (RFID) tag worn or carried by a user (optionally integrated into a user's access card or mobile device), a camera, microphone, or another method. (Wi-Fi is a registered trademark of Wi-Fi Alliance in the United States and other countries. Bluetooth is a registered trademark of Bluetooth SIG, Inc. in the United States and other countries.) A building management system often also includes an ability to locate facility users within a facility, without identifying specific users, using one or more movement sensors, cameras, or another method. Counting the number of users within a space, or whether a space is occupied at all, is useful for efficiently managing a facility. For example, lights can be turned off and heat or air conditioning minimized if a space is currently unoccupied, such as at night or on a weekend.

SUMMARY

The illustrative embodiments provide a method, system, and computer program product. An embodiment includes a method that determines, by analyzing a set of actions of a meeting attendee, a set of accommodation rules for the meeting attendee. An embodiment modifies, responsive to determining, using a set of facility data, that a meeting request for the meeting attendee violates an accommodation rule in the set of accommodation rules, the meeting request, the modified meeting request conforming to the set of accommodation rules. An embodiment assigns, according to the modified meeting request, a meeting location and a meeting time.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
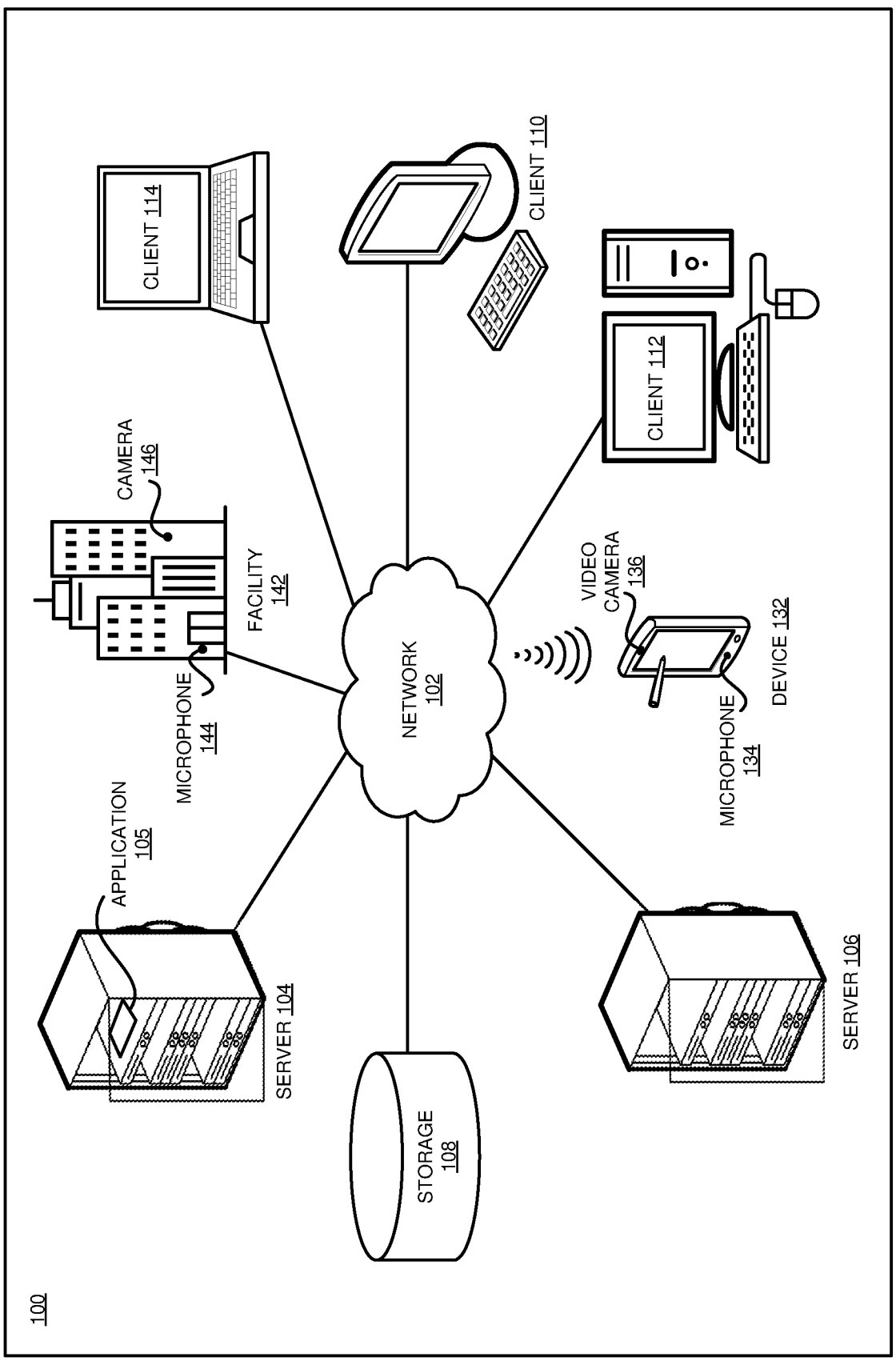
FIG. 1 depicts a block diagram of a network of data processing systems in which illustrative embodiments may be implemented.

The illustrative embodiments recognize that different meeting attendees have different accessibility needs. Even two wheelchair users, for example, might move at different speeds. Those different accessibility needs are also changeable over time. For example, someone recovering from knee surgery might have a crutches-using phase, then a phase of limping without crutches, before gradually resuming his original walking ability and speed.

The illustrative embodiments also recognize that meeting attendees often prefer not to disclose their accessibility needs to others or to ask others for an accommodation, particularly for sensory, cognitive, or other needs that are not immediately visible to others. In addition, some users may have more than one need, but only disclose one (e.g. the one needing the most accommodation or the one most visible to others). In some cases, an attendee may not have even realized she needs an accommodation. For example, someone whose distance vision is slowly becoming worse might not realize that over time she is choosing seats closer and closer to a meeting room's display screen.

The illustrative embodiments also recognize that even when meeting attendees know their general needs and are willing to ask for an accommodation, unfamiliarity with a particular facility may limit their ability to recognize that an accommodation is needed in that facility. For example, a wheelchair-using attendee might be unfamiliar with a facility and not realize that, due to the facility's age and historical significance, certain portions are difficult to access using a wheelchair. As another example, a facility's elevator might be temporarily disabled for repair, forcing a wheelchair-using attendee to select a different route or request a change to a ground-level meeting room. Thus, the illustrative embodiments recognize that there is an unmet need to automatically determine, update, and disseminate a meeting attendee's set of accessibility requirements.

The illustrative embodiments recognize that presently available tools or solutions exist to perform computer-implemented calendaring. For example, existing tools take room size, available equipment (e.g. a display screen), and travel distance into account when assigning a meeting location. However, existing computer-implemented calendaring applications require that users manually configure an accommodation, and do not automatically detect or accommodate meeting attendees' accessibility needs, or do so without disclosing an attendee's needs to others. Existing computer-implemented calendaring applications often do not interface with building management systems and other sources of facility-specific data.

The illustrative embodiments also recognize that, even if computer-implemented calendaring applications do interface with static facility-specific data, such applications lack a predictive component for a user's future accommodation needs, based on a user's current or future needs and predicted facility data. For example, one user might have knee replacement surgery scheduled for next month. Because of the attendant rehabilitation requirements after such a surgery, this user will have different accommodation needs during different post-surgery phases. As another example, a facility's elevator might be scheduled to be temporarily disabled for repair. If a wheelchair-using attendee has a meeting located in an area that is only wheelchair-accessible using the elevator scheduled to be disabled, this user will need to request a change to a ground-level meeting room or reschedule the meeting for a time when the elevator will be available. Thus, the illustrative embodiments recognize that there is an unmet need for a computer-implemented calendaring application that both detects and accommodate meeting attendees' accessibility needs, that is capable of doing so without disclosing an attendee's needs to others, and operates in a facility-specific and predictive manner.

The illustrative embodiments recognize that the presently available tools or solutions do not address these needs or provide adequate solutions for these needs. The illustrative embodiments used to describe the invention generally address and solve the above-described problems and other problems related to accessibility based calendar management.

An embodiment can be implemented as a software application. The application implementing an embodiment can be configured as a modification of an existing computer-implemented calendaring system, as a separate application that operates in conjunction with an existing computer-implemented calendaring system, a standalone application, or some combination thereof.

Particularly, some illustrative embodiments provide a method that determines, by analyzing a meeting attendee's set of actions, a set of accommodation rules for the attendee. The method uses a set of facility rules to determine whether or not a meeting request for the attendee violates an accommodation rule, and if necessary, modifies the meeting request to conform to the set of accommodation rules. The method assigns a meeting location and time according to original or modified meeting request.

An embodiment collects a set of actions of a meeting attendee. In one embodiment, the set of actions includes data of a facility user's movements within the facility. One embodiment collects facility user data using a data collection device installed in the facility. For example, access card data is usable to determine when a user entered each space requiring an access card for entrance, such as a building, elevator, or specific floor, portion of a floor, or room. Wireless communication with a user's device (e.g. via Wi-Fi, Bluetooth, RFID, or another method of wireless communication, on an opt-in basis) is also usable to determine a user's location within a facility, using presently available techniques. One or more cameras, either alone or in conjunction with other data sources, are usable using presently available techniques, on an opt-in basis, to determine a user's locations within a facility, as well as more granular data such as which seat a user sits in in a particular conference room. One or more cameras are also usable using presently available techniques to recognize visible mobility aids such as a wheelchair, crutches, a cane, or a walker. One or more microphones, either alone or in conjunction with other data sources, are usable using presently available voice recognition, speech to text, and natural language understanding techniques, on an opt-in basis, to determine whether or not a user is in a particular room, as well as accommodation needs (e.g. asking for a particular seat, for a break to accommodate a service animal, or if a particular type of food is available) a user expresses during a monitored meeting or when a user triggers such monitoring.

Another embodiment collects data of a facility user's movements within the facility using a portable data collection device of the meeting attendee. For example, presently available mobile telephone devices typically include one or more of a camera, microphone, Global Positioning System (GPS) geolocation capability, Bluetooth capability, Wi-Fi access capability, and the ability to execute software. Thus, a software application executing on such a device is configurable, using presently available techniques, to determine a user's location, which seat a user sits in in a particular conference room, recognize a user's visible mobility aid, recognize a user's request for an accommodation, and collect other data relative to a facility user.

In one embodiment, the set of actions includes a meeting request response history of the meeting attendee. For example, one user might have a history of accepting only meetings held in a particular room or rooms with a particular set of characteristics or installed equipment. Another example user might have a history of declining meetings scheduled at particular times, or of suggesting a reschedule or relocation to accommodate a particular need. A third example user might have a history of requesting one or more accommodations when replying to a meeting request (e.g. availability of a sign-language interpreter, a sufficiently large display screen, a dietary need).

In one embodiment, the set of actions includes a set of parameters specified via a user interface. For example, a user interface of a computer-implemented calendaring system might be configured to solicit a user's specification of a predefined set of accommodations (e.g. using a wheelchair), with an optional opportunity for the user to specify an accommodation not in the predefined set (e.g. Room 123 on the first floor next to Elevator A, or a request for a windowless conference room). An embodiment also includes privacy options a user specifies via a user interface, such as which data is sharable with which other parties and opting in or out to user-specific monitoring when in a particular facility.

In one embodiment, the set of actions includes data of another user, or group of users, sharing a characteristic with the user. For example, User A might have specified that he uses a wheelchair, but because he is a new employee an embodiment has not yet had an opportunity to collect additional data for User A. However, movement history data for additional wheelchair users is available and usable to supplement data that is specific to User A.

An embodiment analyzes the set of actions to determine a set of accommodation rules for the attendee. An attendee's meetings are required to conform to rules in the attendee's set of accommodation rules. Two non-limiting examples of an accommodation rule are that one user requires a wheelchair to move about a facility and another user requires crutches. One embodiment determines mobility aid use by performing an object recognition technique on images of a user to detect use of a known mobility aid. Another embodiment determines mobility aid use by performing a natural language understanding technique on natural language text within a user's meeting request response history, identifying phrases indicating the user's use of a mobility aid (e.g., "Can we meet in Room 123 instead? It's next to the elevator which I need because I use a wheelchair."). Another embodiment determines mobility aid use using a set of parameters specified via a user interface. For example, a user might use the user interface to check a box indicating wheelchair use.

Another non-limiting example of an accommodation rule is a user's typical movement speed within a facility, or typical movement speed within portions of the facility having particular characteristics (e.g. a user might have one speed in flat hallways and another speed ascending and descending stairs). One embodiment determines a user's movement speed by analyzing locations of a user within the facility, and the time taken to move from one location to the other. Other accommodation rules, derived by analyzing data of a user's actions, are also possible and contemplated within the scope of the illustrative embodiments.

An embodiment also, optionally, analyzes the set of actions to determine a set of accommodation preferences for the attendee. An attendee's meetings are not required to conform to preferences in the attendee's set of accommodation preferences, but should conform if possible. An embodiment determines non-limiting examples of accommodation preferences such as a user's usual routes to particular rooms and her preferred seat in those rooms by analyzing the user's movements within the facility, images of the user within the facility, or a combination. An embodiment determines non-limiting examples of accommodation preferences such as asking for a particular seat, for a break to accommodate a service animal, or if a particular type of food is available, by analyzing sound data of a user, by using a natural language understanding technique on a user's speech, responses to meeting requests, parameters entered via a user interface, or a combination of methods. Other accommodation preferences, derived by analyzing data of a user's actions, are also possible and contemplated within the scope of the illustrative embodiments.

An embodiment analyzes the set of actions to predict one or more future accommodation rules and preferences for the attendee. The future accommodation rules and preferences can be the same or different from a present set of rules and preferences. For example, a user might have knee replacement surgery scheduled for next month. Because of the attendant rehabilitation requirements after such a surgery, this user will have different accommodation needs during different post-surgery phases—for example, a wheel-chair using phase, followed by a crutches-using phrase, followed by a phase of walking slowly without a mobility aid. One embodiment allows a user to specify accommodation needs and preferences for each phase via a user interface. Another embodiment uses a natural language understanding technique to predict, using a natural language calendar entry (e.g. the surgery date) and additional natural language data (e.g. a natural language document specifying post-surgery rehabilitation phases), specific accommodation needs and associated dates for each phase. Based on how closely a user's additional actions conform to the predicted accommodation needs, an embodiment adjusts predicted and current accommodation An embodiment uses a set of facility data. The set of facility data includes location data of meeting rooms within a facility, as well as location data of other facility amenities such as elevators, stairs, restrooms, and the like. The set of facility data optionally includes additional accessibility-related data, for example whether a room doorway is wide enough to accommodate a wheelchair. The set of facility data optionally includes additional data, for example, which conference rooms have windows, what presentation equipment is installed in a particular conference room, the size and seating configuration of a particular conference room, and the like. The set of facility data optionally includes future data, such as scheduled maintenance or predicted maintenance based on patterns of previous maintenance.

An embodiment uses a set of facility data to determine whether or not a meeting request for an attendee violates one or more of the set of accommodation rules for the attendee, or will violate one or more of the set of accommodation rules for the attendee at the time the meeting is to occur. For example, a meeting request might specify that a meeting be at a particular location, which might or might not be wheelchair-accessible or otherwise compatible with a user's accommodation rules. As another example, a meeting request might specify a meeting time, which might or might not conform to a user's accommodation rules regarding travel time and the user's other commitments.

If the meeting request conforms to the set of accommodation rules, an embodiment assigns a meeting time and meeting location according to the meeting request. In particular, if the meeting request specifies a location conforming to the set of accommodation rules, an embodiment accepts the specified location. If the meeting request does not specify a particular location, an embodiment assigns a location that conforms to the set of accommodation rules accepts the specified location. Similarly, if the meeting request specifies a time conforming to the set of accommodation rules, an embodiment accepts the specified time. If the meeting request does not specify a particular time, an embodiment assigns a time that conforms to the set of accommodation rules. For example, if the meeting request is simply for a meeting with three colleagues this week, and the user uses a wheelchair and has no other commitments on Tuesday, an embodiment selects a wheelchair-accessible room that holds at least four people and selects 10 am on Tuesday. On the other hand, if the meeting request specifies Room 123 and 10 am on Tuesday, and both conform to the set of accommodation rules, an embodiment assigns Room 123 and 10 am on Tuesday If the meeting request violates one or more accommodation rules, an embodiment modifies the meeting request to conform to the set of accommodation rules, then assigns a meeting time and meeting location according to the modified meeting request. One embodiment modifies a time specified in the original meeting request. Another embodiment modifies a location specified in the original meeting request. For example, if the meeting request specifies Room 456, but Room 456 is not wheelchair-accessible and the user uses a wheelchair, an embodiment assigns Room 123, which is wheelchair-accessible, instead. As another example, if the meeting request specifies Room 789 at 11 am, but the user has another meeting in Room 123 that ends at 11 am, the user requires fifteen minutes to travel from Room 123 to Room 789, an embodiment determines that Room 123 is available at 11 am and selects Room 123 instead, or assigns Room 789 but moves the meeting start time to 11:15 to accommodate the user's travel time requirement.

Another embodiment modifies an additional specification of the meeting request to conform to the attendee's accommodation rules. Some non-limiting examples of an additional specification of the meeting request are a sign-language interpreter, presentation equipment, a special seat, provision of certain food or drinks, and the like. In one embodiment, the identity of the attendee requesting an accommodation is not provided to the meeting request originator, to prevent a perception of asking for special treatment.

If the meeting request violates one or more accommodation preferences, an embodiment determines if modifying the meeting request to conform to the set of accommodation preferences is possible, then assigns a meeting time, meeting location, or additional specification according to the modified meeting request. If modifying the meeting request is not possible, the embodiment retains the original meeting parameters. For example, an attendee might prefer a conference room without windows. If such a room is available and meets the attendee's other accommodation rules, an embodiment assigns a conference room without windows. However, if no such conference rooms are available, an embodiment assigns a different room that also meets the attendee's accommodation rules.

In some cases, an embodiment may not be able to directly assign a meeting location, time, or other parameter, particularly when the meeting request is received from another calendaring system or via another method. Instead, an embodiment either generates a meeting acceptance, if the original request conforms to the user's accommodation rules, or generates a modification request, if the original request does not conform to the user's accommodation rules. For example, if the meeting request specifies Room 456, but Room 456 is not wheelchair-accessible and the user uses a wheelchair, an embodiment generates a request for Room 123, which is wheelchair-accessible, instead. As another example, if the meeting request specifies Room 789 at 11 am, but the user has another meeting in Room 123 that ends at 11 am, the user requires fifteen minutes to travel from Room 123 to Room 789, an embodiment determines that Room 123 is available at 11 am and generates a request for Room 123 instead, or generates a request to move the meeting start time to 11:15 to accommodate the user's travel time requirement.

One embodiment collects attendee data and generates accommodation rules and preferences as a one-time process. Another embodiment continues to collect data of the attendee's actions over time, and uses the data to modify the attendee's set of accommodation rules and preferences. For example, one attendee might not normally use a mobility aid, but was injured over a weekend, and thus arrives at the facility on Monday morning using crutches. An embodiment detects this change, modifies the attendee's set of accommodation rules and preferences to include the need for additional travel time and avoidance of stairs, and responds to new meeting requests (and optionally modifies existing meetings) to conform to the modified rules and preferences. Similarly, as the attendee heals, gains facility with the crutches and eventually no longer needs them, an embodiment detects these changes and modifies the attendee's set of accommodation rules and preferences accordingly.

The manner of accessibility based calendar management described herein is unavailable in the presently available methods in the technological field of endeavor pertaining to computer-implemented calendaring systems. A method of an embodiment described herein, when implemented to execute on a device or data processing system, comprises substantial advancement of the functionality of that device or data processing system in determining, by analyzing a meeting attendee's set of actions, a set of accommodation rules for the attendee. The method uses a set of facility rules to determine whether or not a meeting request for the attendee violates an accommodation rule, and if necessary, modifies the meeting request to conform to the set of accommodation rules. The method assigns a meeting location and time according to original or modified meeting request.

The illustrative embodiments are described with respect to certain types of rules, preferences, accommodations, locations, times, meeting requests, adjustments, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
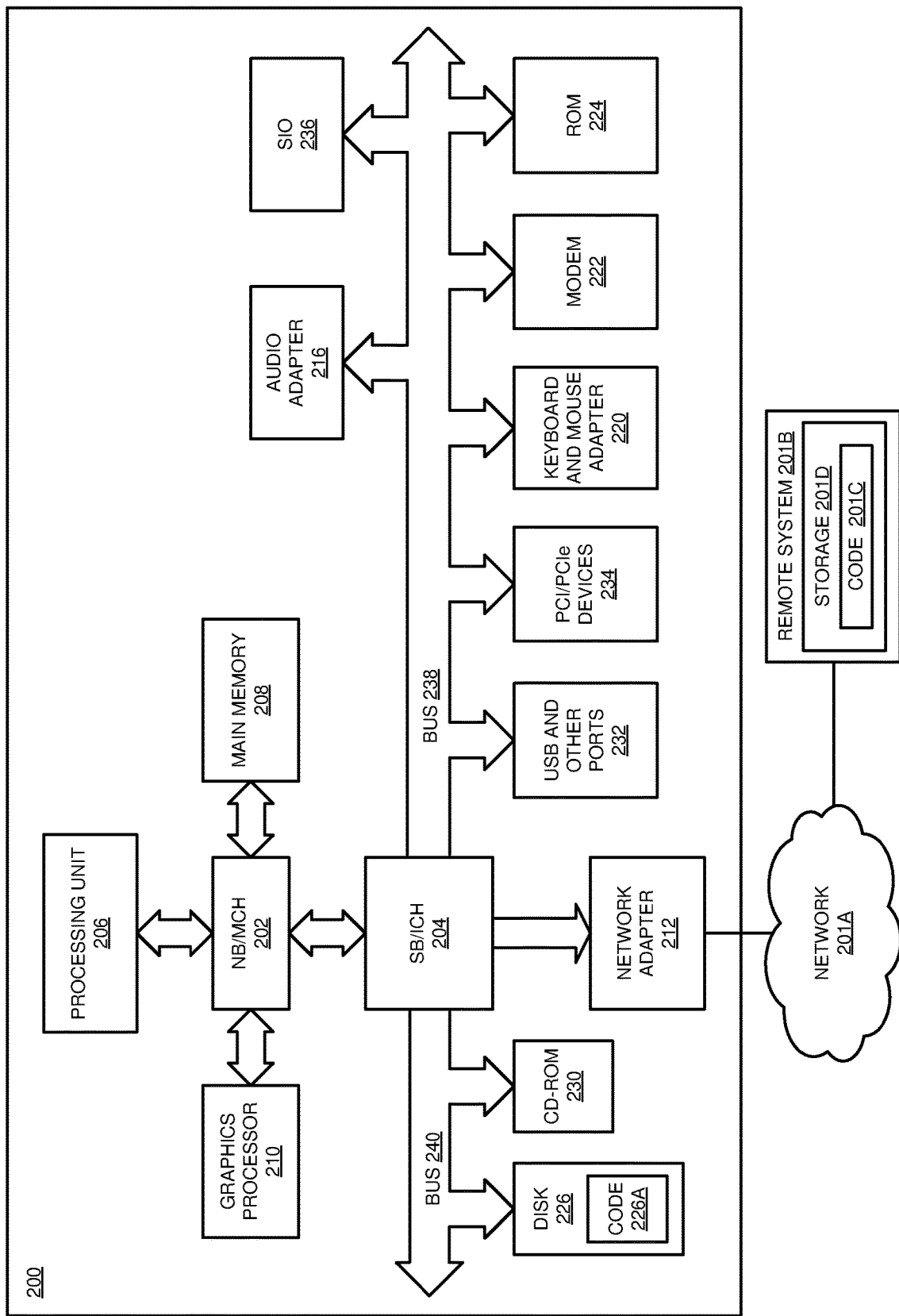
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner. Device 132 includes microphone 134 and video camera 136. Device 132 is configurable to use microphone 134 and video camera 136 to collect data of a facility user.

Facility 142 is an example of a facility described herein, including a data processing system. Any software application described as executing in another data processing system in FIG. 1 can be configured to execute in facility 142 in a similar manner. Any data or information stored or produced in another data processing system in FIG. 1 can be configured to be stored or produced in facility 142 in a similar manner. Facility 142 includes microphone 144 and camera 146. Facility 142 is configurable to use microphone 144 and camera 146 to collect data of a facility user.

Application 105 implements an embodiment described herein. Application 105 executes in any of servers 104 and 106, clients 110, 112, and 114, facility 142, and device 132, or in a combination of devices. For example, application 105 is configurable to execute in server 104 and collect data from facility 142 or device 132.

Servers 104 and 106, storage unit 108, and clients 110, 112, and 114, facility 142, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
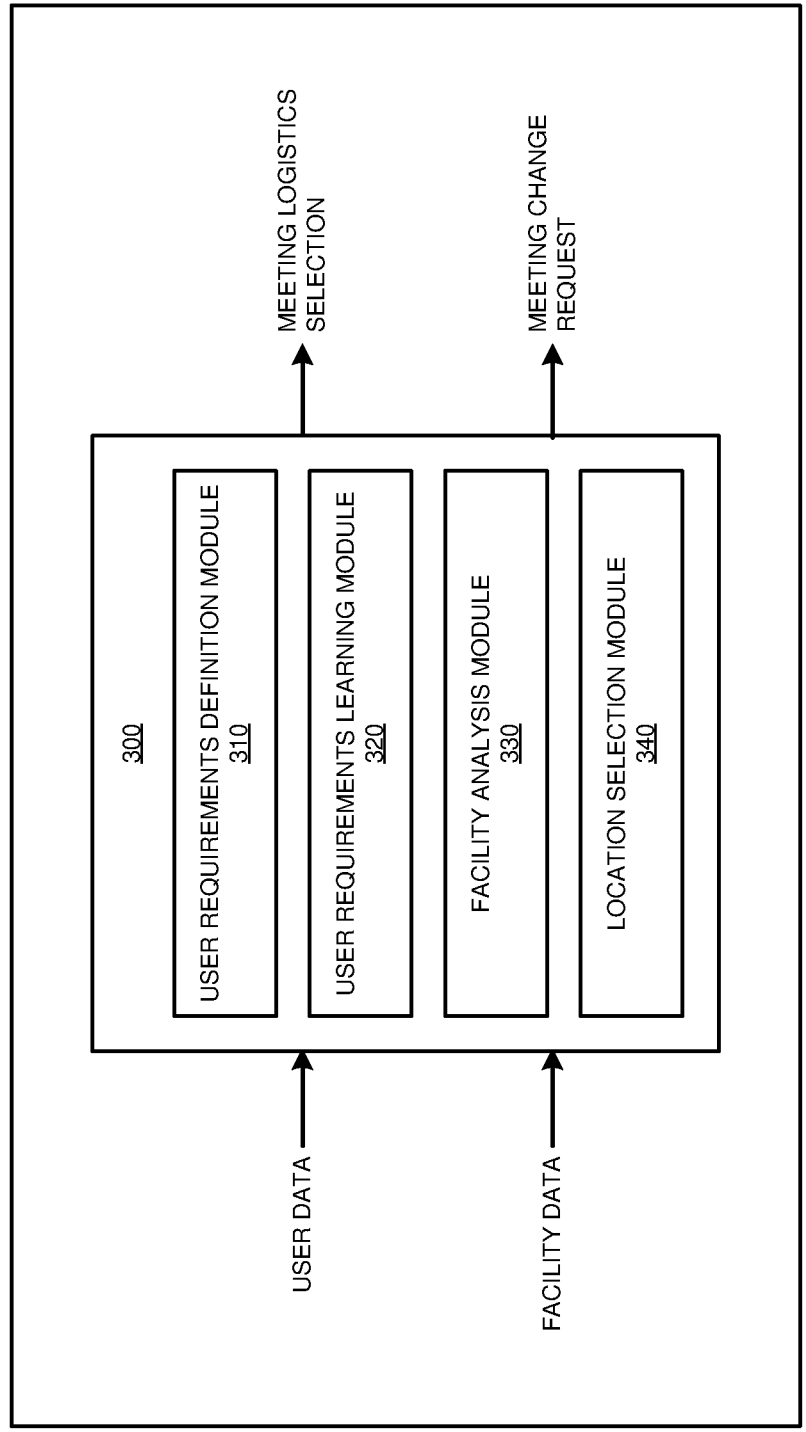
FIG. 3 depicts a block diagram of an example configuration for accessibility based calendar management in accordance with an illustrative embodiment.

With reference to FIG. 3, this figure depicts a block diagram of an example configuration for accessibility based calendar management in accordance with an illustrative embodiment. Application 300 is an example of application 105 in FIG. 1 and executes in any of servers 104 and 106, clients 110, 112, and 114, facility 142, and device 132 in FIG. 1.

User requirements definition module 310 collects a set of actions of a meeting attendee. In one implementation of module 310, the set of actions includes data of a facility user's movements within the facility. One implementation of module 310 collects facility user data using a data collection device installed in the facility, for example an access card reader, via wireless communication with a user's device, or using a camera or microphone. Another implementation of module 310 collects data of a facility user's movements within the facility using a portable data collection device of the meeting attendee, for example a mobile telephone device including one or more of a camera, microphone, GPS geolocation capability, Bluetooth capability, Wi-Fi access capability, and the ability to execute software.

In one implementation of module 310, the set of actions includes a meeting request response history of the meeting attendee. In another implementation of module 310, the set of actions includes a set of parameters specified via a user interface. Module 310 also includes privacy options a user specifies via the user interface, such as which data is sharable with which other parties and opting in or out to user-specific monitoring when in a particular facility. In one implementation of module 310, the set of actions includes data of another user, or group of users, sharing a characteristic with the user.

User requirements learning module 320 analyzes the set of actions to determine a set of accommodation rules for the attendee. An attendee's meetings are required to conform to rules in the attendee's set of accommodation rules. Module 320 also, optionally, analyzes the set of actions to determine a set of accommodation preferences for the attendee. An attendee's meetings are not required to conform to preferences in the attendee's set of accommodation preferences, but should conform if possible. More detail of module 320 is provided with reference to FIG. 4.

Facility analysis module 330 uses a set of facility data. The set of facility data includes location data of meeting rooms within a facility, as well as location data of other facility amenities such as elevators, stairs, restrooms, and the like. The set of facility data optionally includes additional accessibility-related data, for example whether a room doorway is wide enough to accommodate a wheelchair. The set of facility data optionally includes additional data, for example, which conference rooms have windows, what presentation equipment is installed in a particular conference room, the size and seating configuration of a particular conference room, and the like. Module 330 uses a set of facility data to determine whether or not a meeting request for an attendee violates one or more of the accommodation rules for the attendee.

Location selection module operates in conjunction with module 330 to assign meeting time, location, and other meeting parameters according to a meeting request. In particular, if the meeting request specifies a location conforming to the set of accommodation rules, module 340 accepts the specified location. If the meeting request does not specify a particular location, module 340 assigns a location that conforms to the set of accommodation rules. Similarly, if the meeting request specifies a time conforming to the set of accommodation rules, module 340 accepts the specified time. If the meeting request does not specify a particular time, module 340 assigns a time that conforms to the set of accommodation rules.

If the meeting request violates one or more accommodation rules, module 340 modifies the meeting request to conform to the set of accommodation rules, then assigns a meeting time and meeting location according to the modified meeting request. One implementation of module 340 modifies a time specified in the original meeting request. Another implementation of module 340 modifies a location specified in the original meeting request. Another implementation of module 340 modifies an additional specification of the meeting request to conform to the attendee's accommodation rules. Some non-limiting examples of an additional specification of the meeting request are a sign-language interpreter, presentation equipment, a special seat, provision of certain food or drinks, and the like. In one implementation of module 340, the identity of the attendee requesting an accommodation is not provided to the meeting request originator, to prevent a perception of asking for special treatment.

If the meeting request violates one or more accommodation preferences, module 340 determines if modifying the meeting request to conform to the set of accommodation preferences is possible, then assigns a meeting time, meeting location, or additional specification according to the modified meeting request. If modifying the meeting request is not possible, module 340 retains the original meeting parameters.

Application 300 continues to collect data of the attendee's actions, and uses the data to modify the attendee's set of accommodation rules and preferences in a manner described herein.

Figure 4:
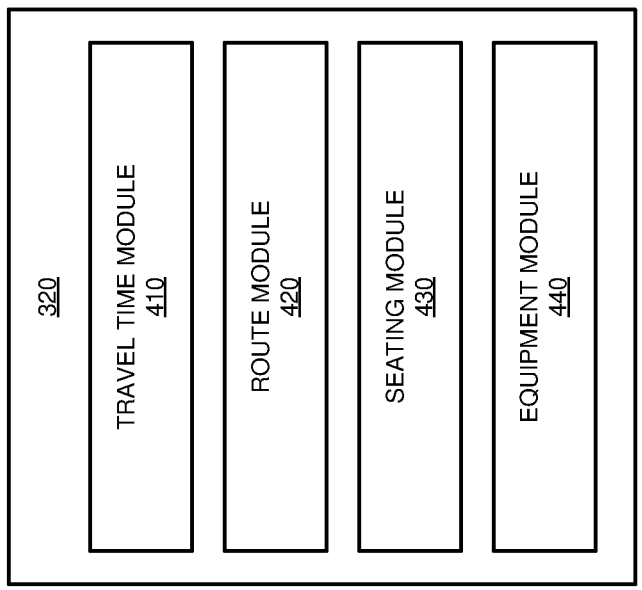
FIG. 4 depicts a block diagram of an example configuration for accessibility based calendar management in accordance with an illustrative embodiment.

With reference to FIG. 4, this figure depicts a block diagram of an example configuration for accessibility based calendar management in accordance with an illustrative embodiment. In particular, FIG. 4 depicts more detail of module 320 in FIG. 3.

Travel time module 410 determines a user's typical movement speed within a facility, or typical movement speed within portions of the facility having particular characteristics. One implementation of module 410 determines a user's movement speed by analyzing locations of a user within the facility, and the time taken to move from one location to the other.

Route module 420 determines a user's usual routes to particular rooms and her preferred seat in those rooms by analyzing the user's movements within the facility, images of the user within the facility, or a combination.

Seating module 430 determines a user's seating requirements and preferences using a camera to detect where a user sits in particular rooms, using a wireless communication method to locate a user within particular rooms, by analyzing sound data of a user, by using a natural language understanding technique on a user's speech, responses to meeting requests, parameters entered via a user interface, or a combination of methods.

Equipment module 440 determines accommodation rules and preferences related to an attendee's mobility aids (e.g. wheelchair or crutches), presentation equipment needs (e.g. a large display screen), and the like. One implementation of module 440 determines mobility aid use by performing an object recognition technique on images of a user to detect use of a known mobility aid. Another implementation of module 440 determines mobility aid use by performing a natural language understanding technique on natural language text within a user's meeting request response history, identifying phrases indicating the user's use of a mobility aid. Another implementation of module 440 determines mobility aid use using a set of parameters specified via a user interface.

In addition, module 320 determines non-limiting examples of accommodation preferences such as asking for a break to accommodate a service animal, or if a particular type of food is available, by analyzing sound data of a user, by using a natural language understanding technique on a user's speech, responses to meeting requests, parameters entered via a user interface, or a combination of methods.

Figure 5:
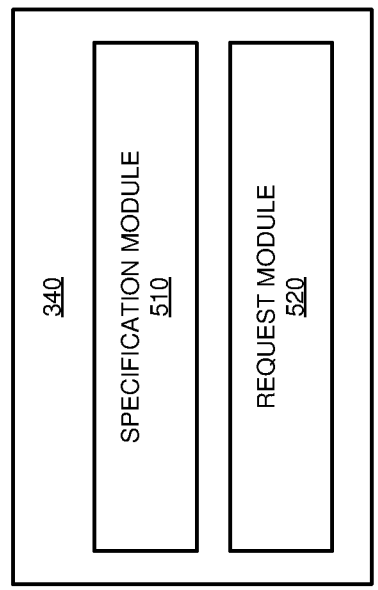
FIG. 5 depicts a block diagram of an example configuration for accessibility based calendar management in accordance with an illustrative embodiment.

With reference to FIG. 5, this figure depicts a block diagram of an example configuration for accessibility based calendar management in accordance with an illustrative embodiment. In particular, FIG. 5 depicts more detail of module 340 in FIG. 3.

Specification module 510 assigns meeting location, time, and additional meeting parameters. Request module 520 generates a meeting acceptance, if the original request conforms to the user's accommodation rules, or generates a modification request, if the original request does not conform to the user's accommodation rules.

Figure 6:
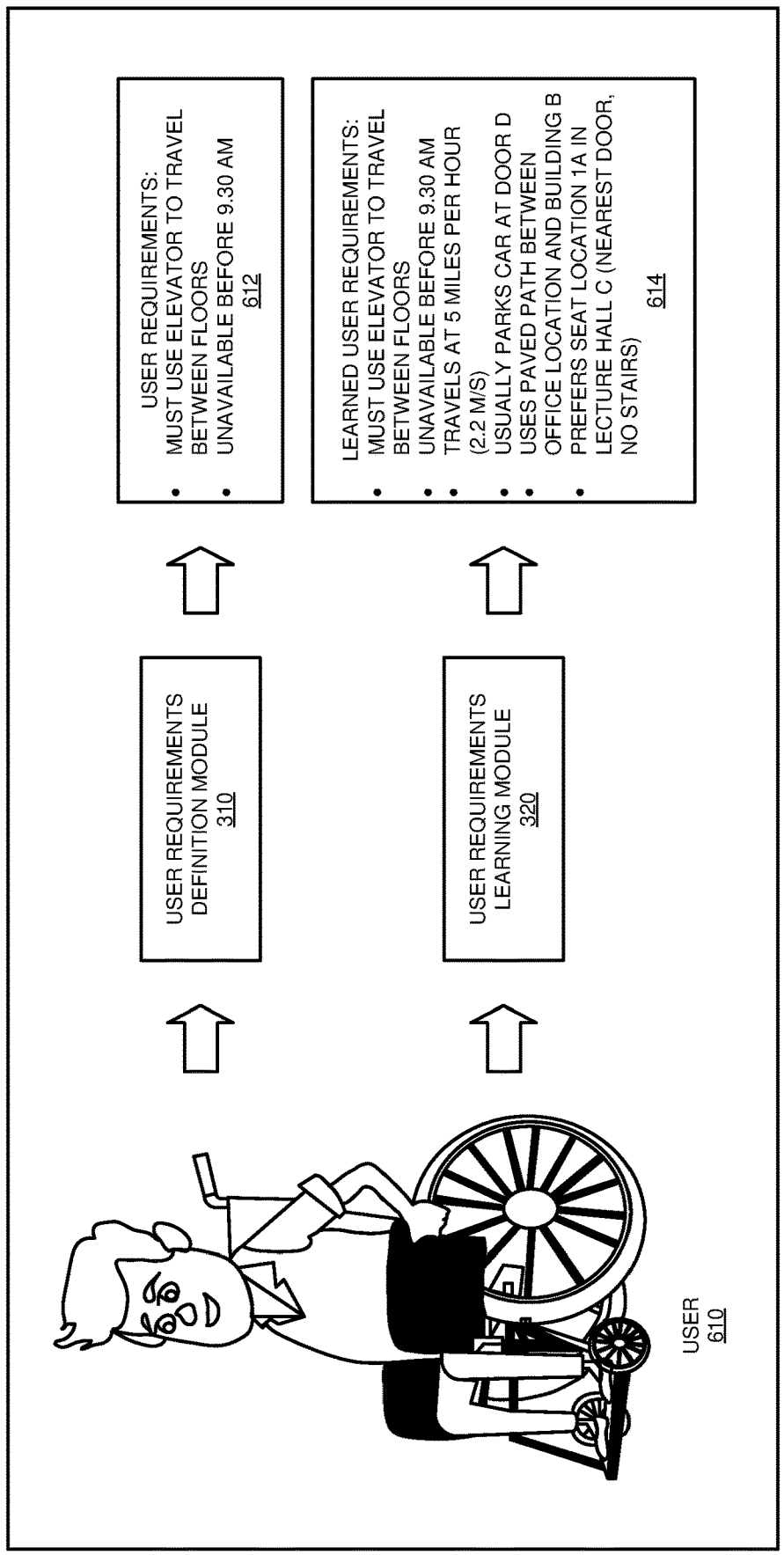
FIG. 6 depicts an example of accessibility based calendar management in accordance with an illustrative embodiment.

With reference to FIG. 6, this figure depicts an example of accessibility based calendar management in accordance with an illustrative embodiment. The example can be executed using any of servers 104 and 106, clients 110, 112, and 114, facility 142, and device 132 in FIG. 1. User requirements definition module 310 and user requirements learning module 320 are the same as user requirements definition module 310 and user requirements learning module 320 in FIG. 3.

As depicted, user requirements definition module 310 collects a set of actions of user 610, a meeting attendee who uses a wheelchair. Here, for ease of illustration only, the set of actions includes user requirements 612, specified via a user interface. User requirements learning module 320 analyzes user 610's actions, including movement history to determine requirements 614, a set of accommodation rules and preferences for user 610.

Figure 7:
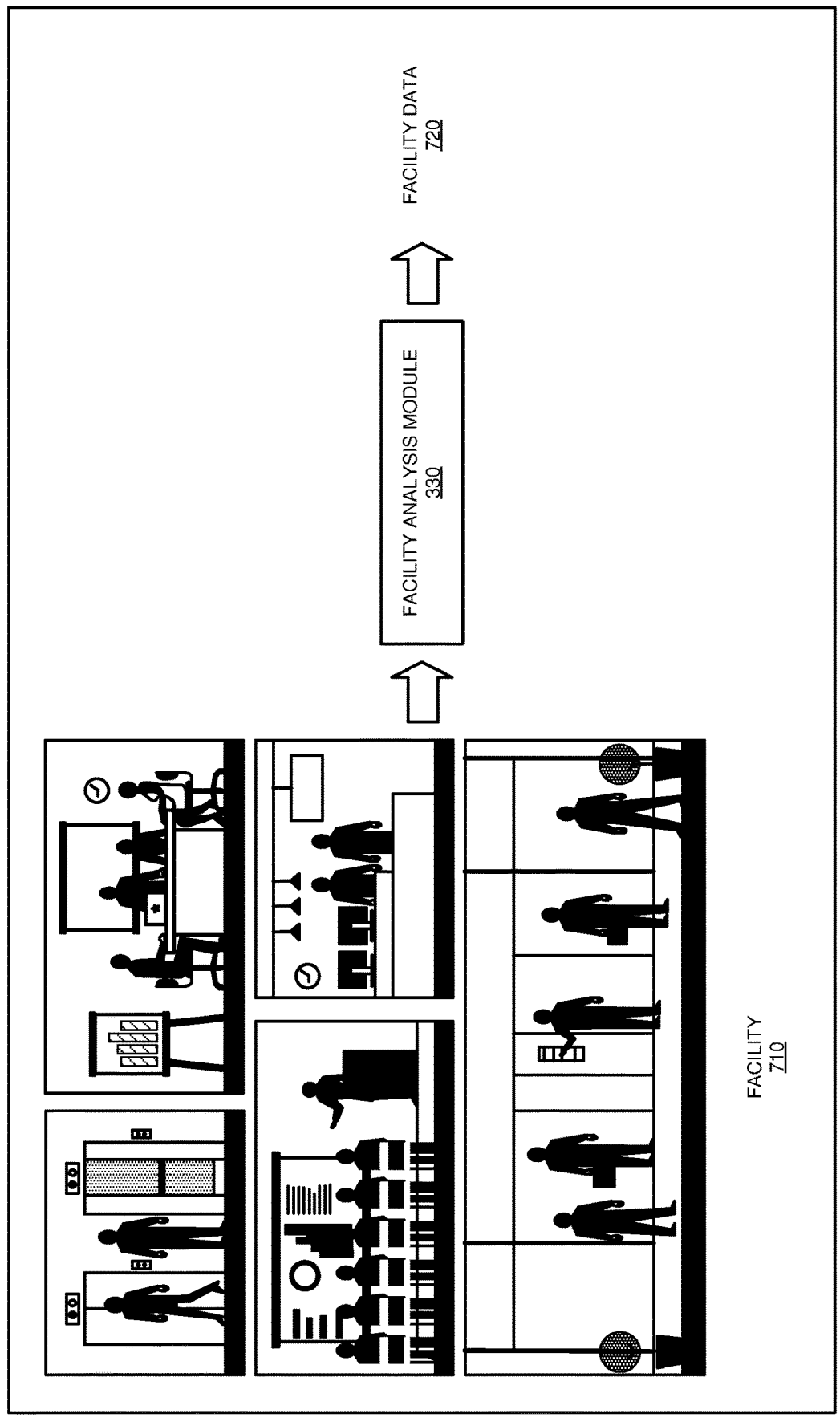
FIG. 7 depicts a continued example of accessibility based calendar management in accordance with an illustrative embodiment.

With reference to FIG. 7, this figure depicts a continued example of accessibility based calendar management in accordance with an illustrative embodiment. Facility analysis module 330 is the same as facility analysis module 330 in FIG. 3.

As depicted, facility analysis module 330 uses a set of facility data of facility 710, a facility in which user 610 will be attending a meeting. Module 330 generates facility data 720, used to determine whether or not a meeting request for an attendee violates one or more of the accommodation rules for the attendee.

Figure 8:
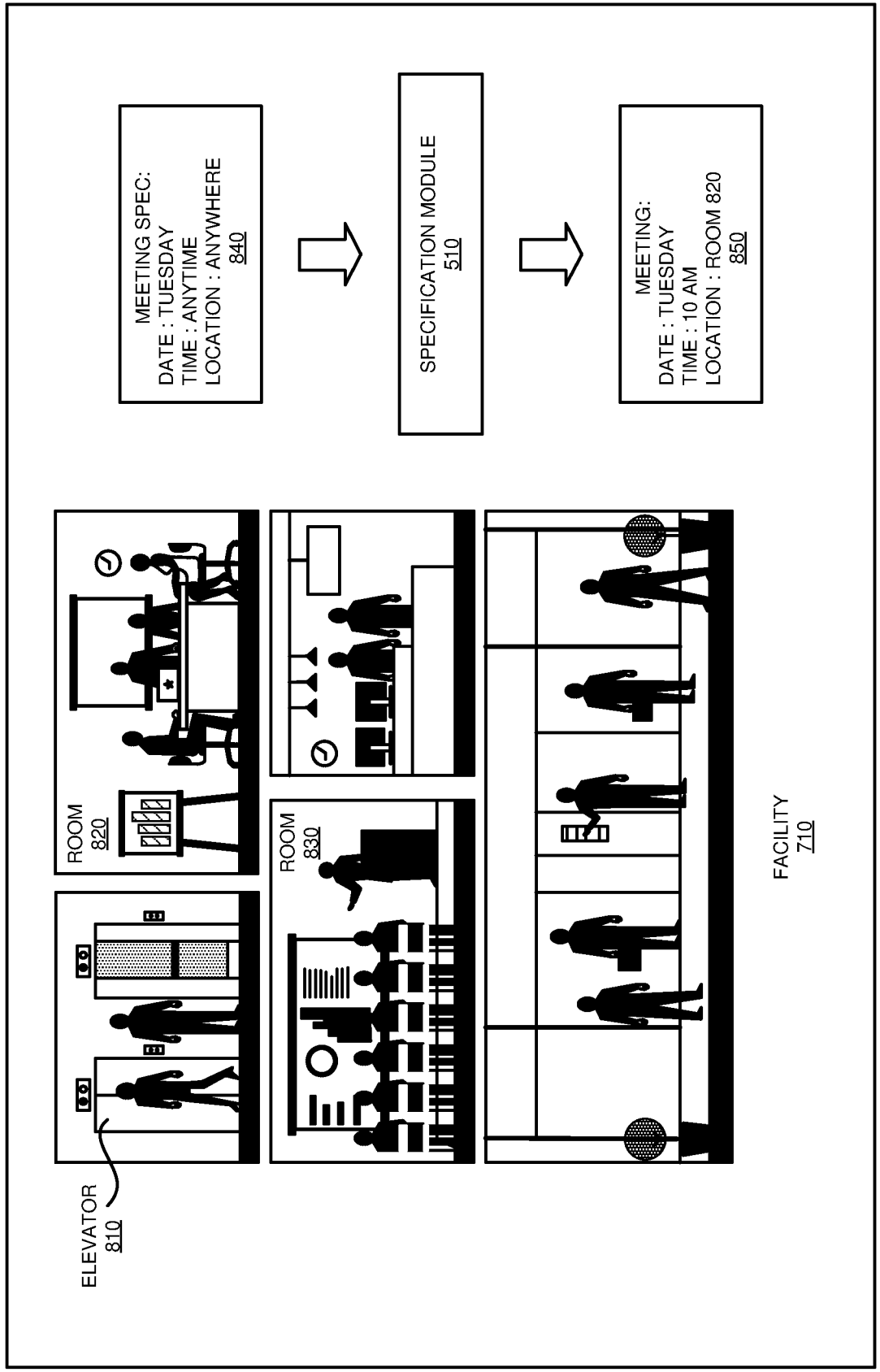
FIG. 8 depicts a continued example of accessibility based calendar management in accordance with an illustrative embodiment.

With reference to FIG. 8, this figure depicts a continued example of accessibility based calendar management in accordance with an illustrative embodiment. Specification module 510 is the same as specification module 510 in FIG. 5. Facility 710 is the same as facility 710 in FIG. 7.

As depicted, facility 710 includes elevator 810 and conference rooms 820 and 830. Module 510 receives meeting specification 840, for a meeting Tuesday. Because meeting specification 840 does not specify a particular location, module 510 assigns a location that conforms to requirements 614 (depicted in FIG. 6). Similarly, because meeting specification 840 does not specify a particular time, module 510 assigns a time that conforms to requirements 614. The result is depicted in meeting 850.

Figure 9:
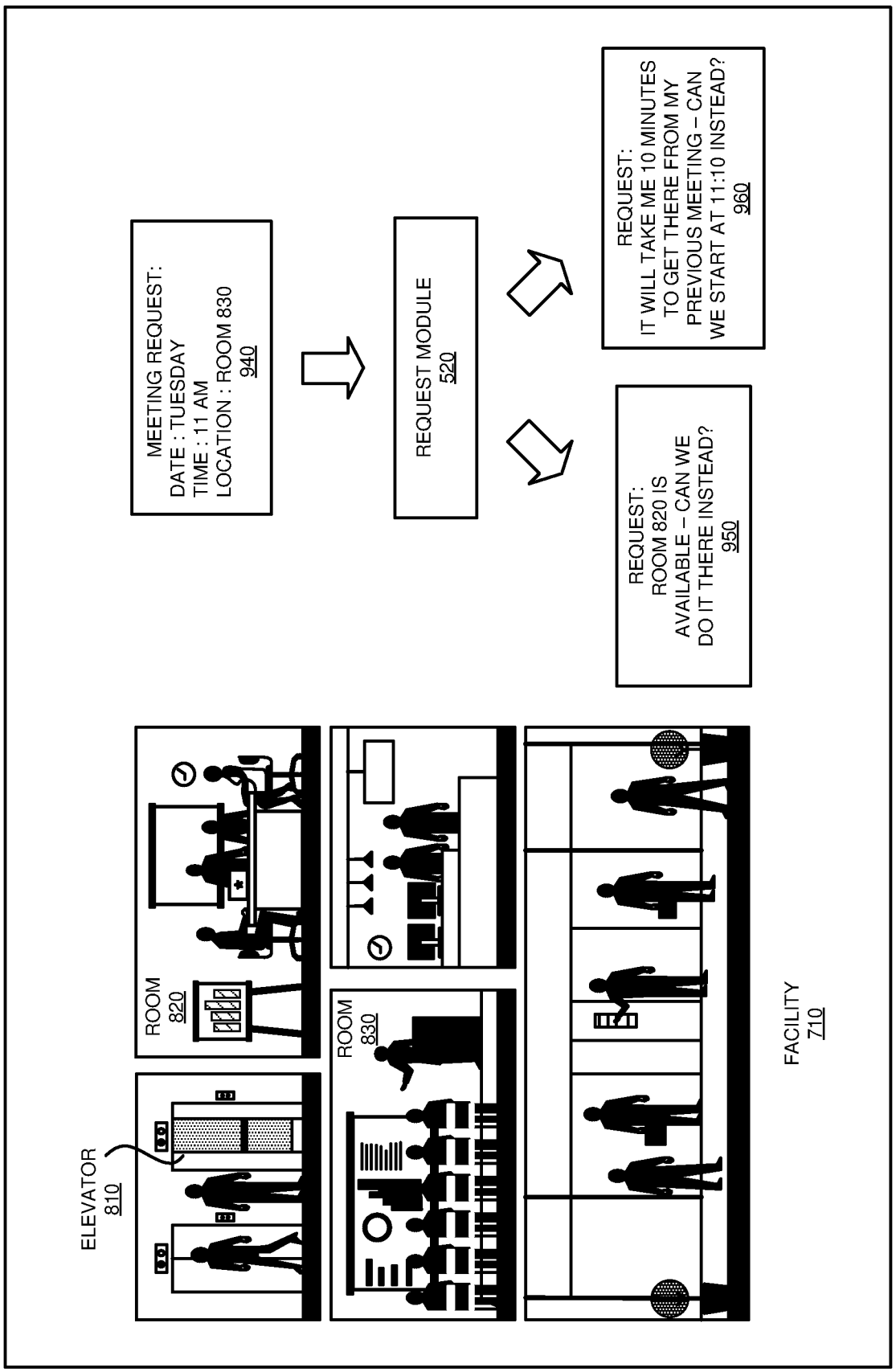
FIG. 9 depicts a continued example of accessibility based calendar management in accordance with an illustrative embodiment.

With reference to FIG. 9, this figure depicts a continued example of accessibility based calendar management in accordance with an illustrative embodiment. Request module 510 is the same as request module 510 in FIG. 5. Facility 710 is the same as facility 710 in FIG. 7. Elevator 810 and conference rooms 820 and 830 are the same as elevator 810 and conference rooms 820 and 830 in FIG. 8.

Here, module 520 receives meeting request 940, for a meeting Tuesday at 11 am in Room 830. However, user 610 has another meeting in Room 820 that ends at 11 am, and the user requires ten minutes to travel from Room 820 to Room 830. Thus, module 520 determines that Room 820 is available at 11 am and generates request 950, suggesting Room 820 instead. Alternatively, module 520 generates request 960 to move the meeting start time to 11:10 to accommodate user 610's travel time requirement.

Figure 10:
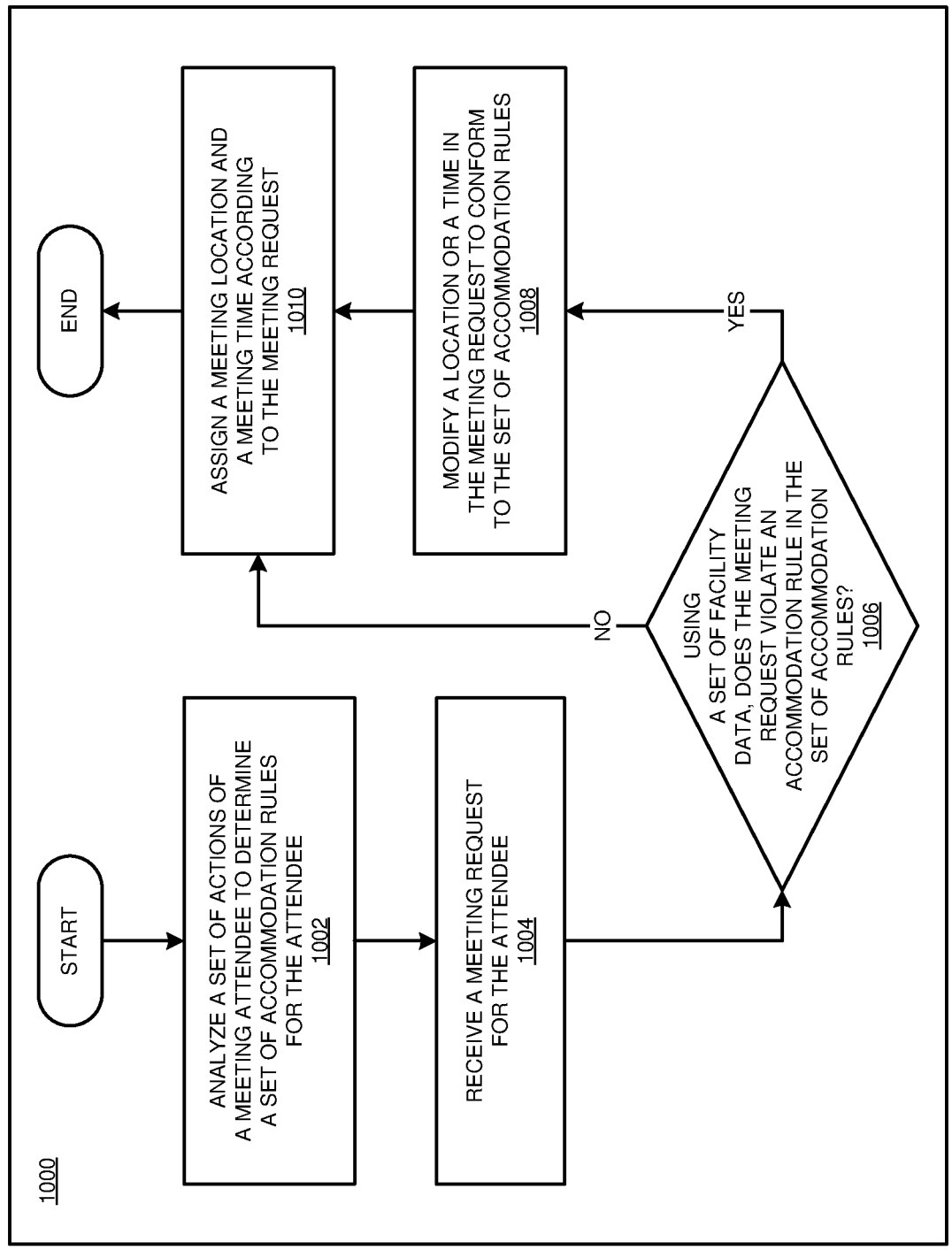
FIG. 10 depicts a flowchart of an example process for accessibility based calendar management in accordance with an illustrative embodiment.

With reference to FIG. 10, this figure depicts a flowchart of an example process for accessibility based calendar management in accordance with an illustrative embodiment. Process 1000 can be implemented in application 300 in FIG. 3.

In block 1002, the application analyzes a set of actions of a meeting attendee to determine a set of accommodation rules for the attendee. In block 1004, the application receives a meeting request for the attendee. In block 1006, the application, using a set of facility data, determines whether the meeting request violates an accommodation rule in the set of accommodation rules. If yes ("YES" path of block 1006), in block 1008, the application modifies a location or a time in the meeting request to conform to the set of accommodation rules. Then (also "NO" path of block 1006), in block 1010 the application assigns a meeting location and a meeting time according to the meeting request. Then the application ends.

Figure 11:
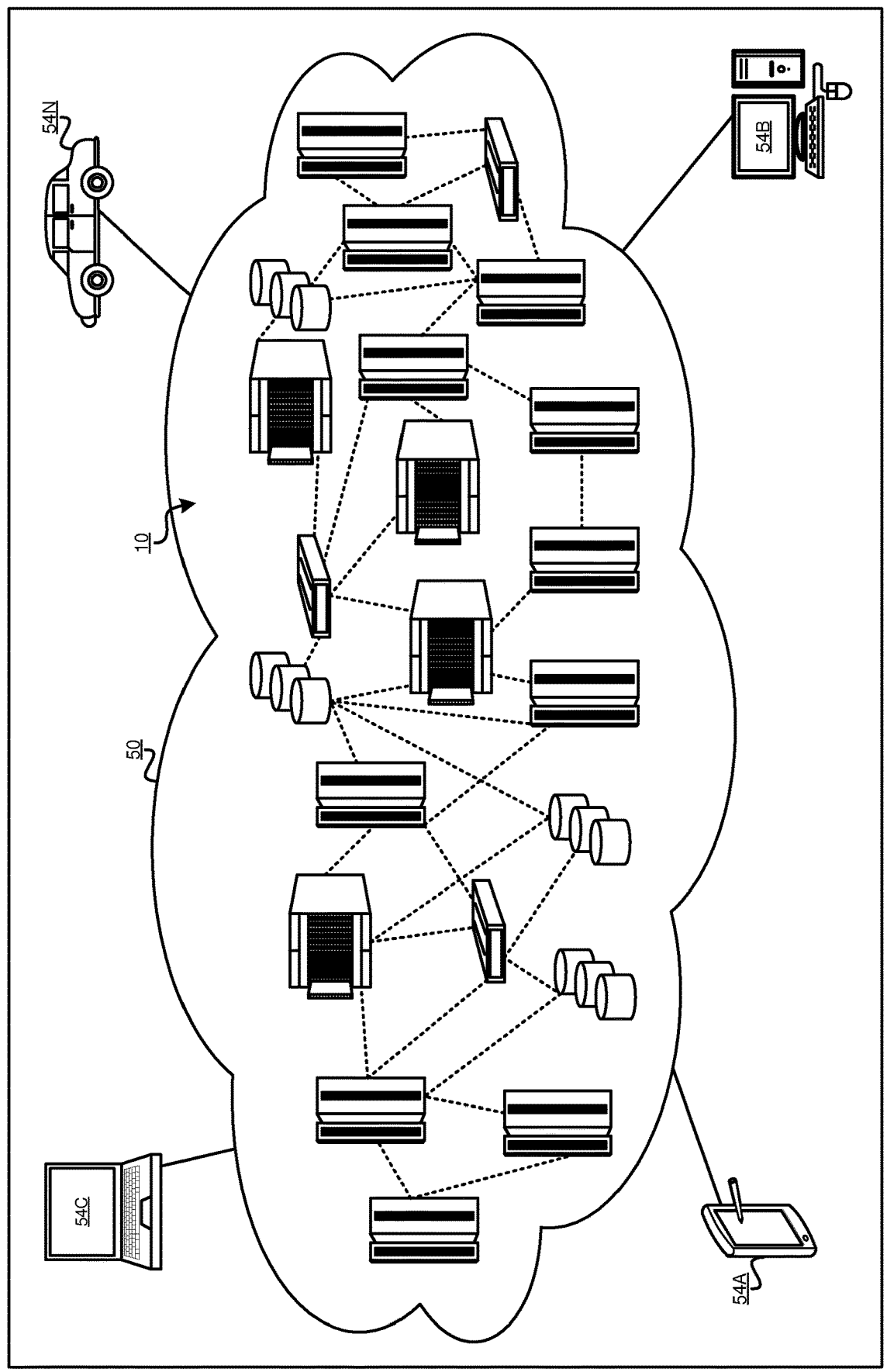
FIG. 11 depicts a cloud computing environment according to an embodiment of the present invention.

Referring now to FIG. 11, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 12:
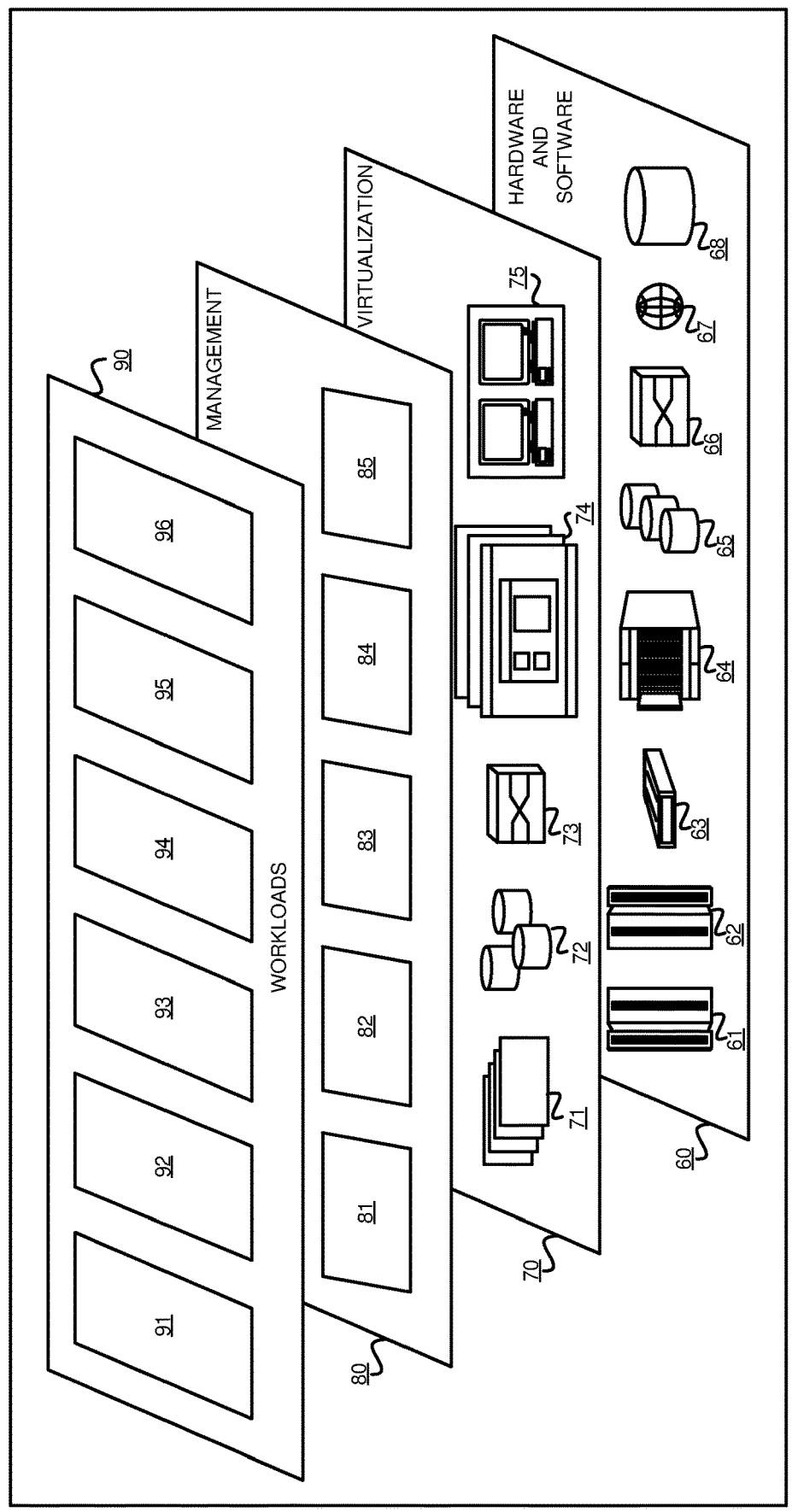
FIG. 12 depicts abstraction model layers according to an embodiment of the present invention.

Referring now to FIG. 12, a set of functional abstraction layers provided by cloud computing environment 50 (FIG. 11) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for accessibility based calendar management and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    collecting, using a camera and a microphone, movement history data of a meeting attendee within a facility, wherein the movement history data from the camera and the microphone is provided by a building management system;
    recognizing, within the movement history data, usage of a visible mobility aid by the meeting attendee;
    recognizing, within the movement history data, an accommodation need usage expressed in natural language by the meeting attendee;
    determining, by analyzing the movement history data, the usage of the visible mobility aid, and the expressed accommodation need, a set of current accommodation rules for the meeting attendee;
    predicting, using the set of current accommodation rules and an analysis of a natural language document specifying usage, at a time in the future, of a second mobility aid by the meeting attendee, a set of predicted accommodation rules for the meeting attendee, the set of predicted accommodation rules comprising the time in the future, the set of predicted accommodation rules at least partially differing from the set of current accommodation rules;
    modifying, responsive to determining, using a set of predicted facility data, that a meeting request for the meeting attendee violates a predicted accommodation rule in the set of predicted accommodation rules, the meeting request, the modified meeting request conforming to the set of predicted accommodation rules; and
    assigning, according to the modified meeting request, a meeting location and a meeting time.

2. The computer-implemented method of claim 1, further comprising:
    assigning, responsive to determining, using the set of predicted facility data, that the meeting request conforms to the set of predicted accommodation rules, a meeting location and a meeting time according to the meeting request.

3. The computer-implemented method of claim 1, wherein the movement history data is collected using a data collection device installed in the facility.

4. The computer-implemented method of claim 1, wherein the movement history data is collected using a portable data collection device of the meeting attendee.

5. The computer-implemented method of claim 1, wherein the set of current accommodation rules is further determined by analyzing a meeting request response history of the meeting attendee.

6. The computer-implemented method of claim 1, wherein the set of current accommodation rules is further determined from a set of parameters specified using a user interface.

7. The computer-implemented method of claim 1, wherein modifying the meeting request comprises modifying a location specified by the meeting request.

8. The computer-implemented method of claim 1, wherein modifying the meeting request comprises modifying a time specified by the meeting request.

9. The computer-implemented method of claim 1, wherein the violated predicted accommodation rule comprises a travel time requirement.

10. A computer program product for accessibility based calendar management, the computer program product comprising:
    one or more computer readable storage media, and program instructions collectively stored on the one or more computer readable storage media, the program instructions comprising:
        program instructions to collect, using a camera and a microphone, movement history data of a meeting attendee within a facility, wherein the movement history data from the camera and the microphone is provided by a building management system;
        program instructions to recognize, within the movement history data, usage of a visible mobility aid by the meeting attendee;
        program instructions to recognize, within the movement history data, an accommodation need usage expressed in natural language by the meeting attendee;
        program instructions to determine, by analyzing the movement history data, the usage of the visible mobility aid, and the expressed accommodation need, a set of current accommodation rules for the meeting attendee;

program instructions to predict, using the set of current accommodation rules and an analysis of a natural language document specifying usage, at a time in the future, of a second mobility aid by the meeting attendee, a set of predicted accommodation rules for the meeting attendee, the set of predicted accommodation rules comprising the time in the future, the set of predicted accommodation rules at least partially differing from the set of current accommodation rules;

program instructions to modify, responsive to determining, using a set of predicted facility data, that a meeting request for the meeting attendee violates a predicted accommodation rule in the set of predicted accommodation rules, the meeting request, the modified meeting request conforming to the set of predicted accommodation rules; and program instructions to assign, according to the modified meeting request, a meeting location and a meeting time.

11. The computer program product of claim 10, further comprising:

program instructions to assign, responsive to determining, using the set of predicted facility data, that the meeting request conforms to the set of predicted accommodation rules, a meeting location and a meeting time according to the meeting request.

12. The computer program product of claim 10, wherein the movement history data is collected using a data collection device installed in the facility.

13. The computer program product of claim 10, wherein the movement history data is collected using a portable data collection device of the meeting attendee.

14. The computer program product of claim 10, wherein the set of current accommodation rules is further determined by analyzing a meeting request response history of the meeting attendee.

15. The computer program product of claim 10, wherein the stored program instructions are stored in the at least one of the one or more storage media of a local data processing system, and wherein the stored program instructions are transferred over a network from a remote data processing system.

16. The computer program product of claim 10, wherein the stored program instructions are stored in the at least one of the one or more storage media of a server data processing system, and wherein the stored program instructions are downloaded over a network to a remote data processing system for use in a computer readable storage device associated with the remote data processing system.

17. The computer program product of claim 10, wherein the computer program product is provided as a service in a cloud environment.

18. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to collect, using a camera and a microphone, movement history data of a meeting attendee within a facility, wherein the movement history data from the camera and the microphone is provided by a building management system;

program instructions to recognize, within the movement history data, usage of a visible mobility aid by the meeting attendee;

program instructions to recognize, within the movement history data, an accommodation need usage expressed in natural language by the meeting attendee;

program instructions to determine, by analyzing the movement history data, the usage of the visible mobility aid, and the expressed accommodation need, a set of current accommodation rules for the meeting attendee;

program instructions to predict, using the set of current accommodation rules and an analysis of a natural language document specifying usage, at a time in the future, of a second mobility aid by the meeting attendee, a set of predicted accommodation rules for the meeting attendee, the set of predicted accommodation rules comprising the time in the future, the set of predicted accommodation rules at least partially differing from the set of current accommodation rules;

program instructions to modify, responsive to determining, using a set of predicted facility data, that a meeting request for the meeting attendee violates a predicted accommodation rule in the set of predicted accommodation rules, the meeting request, the modified meeting request conforming to the set of predicted accommodation rules; and program instructions to assign, according to the modified meeting request, a meeting location and a meeting time.

* * * * *